(12) United States Patent
Sawata et al.

(10) Patent No.: US 11,581,782 B2
(45) Date of Patent: Feb. 14, 2023

(54) ELECTRIC PROPULSION SYSTEM

(71) Applicant: Hamilton Sundstrand Corporation, Charlotte, NC (US)

(72) Inventors: Tadashi Sawata, Coventry (GB); Andrew Page, Herts (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 677 days.

(21) Appl. No.: 16/564,129

(22) Filed: Sep. 9, 2019

(65) Prior Publication Data
US 2020/0195089 A1    Jun. 18, 2020

(30) Foreign Application Priority Data
Dec. 14, 2018   (EP) .................. 18275183

(51) Int. Cl.
H02K 7/08      (2006.01)
H02K 37/08     (2006.01)
B64D 27/24     (2006.01)
H02K 21/24     (2006.01)
H02K 7/00      (2006.01)

(52) U.S. Cl.
CPC ............ H02K 7/088 (2013.01); B64D 27/24 (2013.01); H02K 37/08 (2013.01); H02K 7/003 (2013.01); H02K 21/24 (2013.01)

(58) Field of Classification Search
CPC ........ H02K 7/088; H02K 37/08; H02K 21/24; H02K 7/14; H02K 5/165; H02K 5/00; H02K 7/003; H02K 7/086; B64D 27/24; B64D 35/02; Y02T 50/60
See application file for complete search history.

(56) References Cited

U.S. PATENT DOCUMENTS

| 6,756,719 B1 | 6/2004 | Chiu |
| 9,631,516 B2* | 4/2017 | Hamann ............... F01D 25/16 |
| 2010/0143164 A1 | 6/2010 | Yan et al. |
| 2010/0207478 A1 | 8/2010 | Dev |
| 2021/0119499 A1* | 4/2021 | Lehikoinen ............ H02K 1/165 |

FOREIGN PATENT DOCUMENTS

| EP | 2613033 A2 | 7/2013 |
| EP | 2613033 A3 | 12/2017 |
| GB | 2264812 A | 9/1993 |
| WO | 2016020915 A1 | 2/2016 |
| WO | WO-2017186755 A1 * | 11/2017 |

OTHER PUBLICATIONS

Extended European Search Report for International Application No. 18275183.4 dated Jul. 9, 2019, 9 pages.

* cited by examiner

Primary Examiner — Joseph Ortega
(74) Attorney, Agent, or Firm — Cantor Colburn LLP

(57) ABSTRACT

An electric propulsion system, comprising a propeller and a motor arranged to rotate the propeller, the motor comprising an axial flux motor comprising a rotor disc and a stator disc mounted in face-to-face relationship with an air gap defined therebetween, the rotor disc driven to rotate relative to the stator disc to cause magnetic flux in the air gap to cause rotation of the propeller, characterised in that the propeller is directly attached to the rotor disc to rotate with the rotor disc.

3 Claims, 3 Drawing Sheets

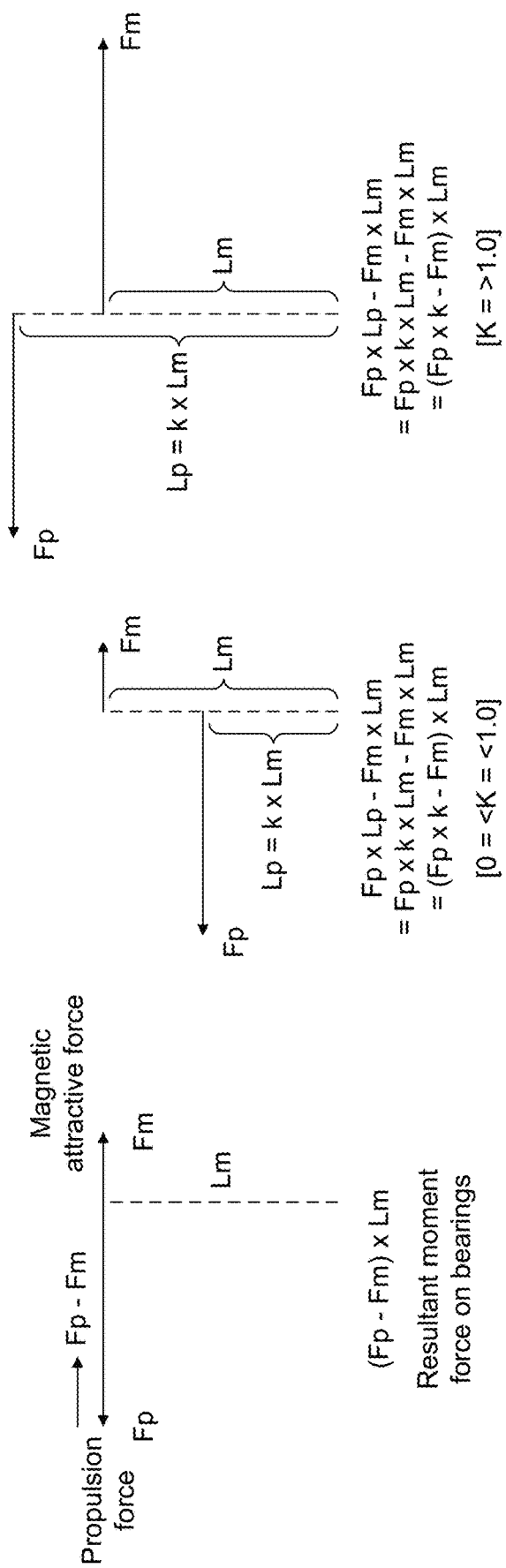

ELECTRIC PROPULSION SYSTEM

FOREIGN PRIORITY

This application claims priority to European Patent Application No. 18275183.4 filed Dec. 14, 2018, the entire contents of which is incorporated herein by reference.

TECHNICAL FIELD

The present disclosure is concerned with electric propulsion systems particularly, but not exclusively, for driving propeller aircraft.

BACKGROUND

Many aircraft are driven by propellers that rotate to propel the aircraft through the air. A drive means such as a jet or piston engine or an electric motor is required to cause the propeller to rotate. Typically several hundred kW or more of power from the motor is required.

Various types of electric motor can be used to drive the propeller but generally, motors that can produce the required power are large and heavy and not particularly efficient. A standard radial flux electric motor comprises a rotor surrounded by a stator, the rotor caused to rotate relative to the stator to generate power.

In an electric motor, the moving part is the rotor, which turns a shaft to deliver the mechanical power. The rotor usually carries permanent magnets, and the stator carries conductors that carry currents, which interact with the magnetic field of the stator to generate the forces that turn the shaft. Alternatively, the stator can carry the magnets and the rotor holds the conductors. The rotor is supported by bearings, which allow the rotor to turn on its axis. The bearings are in turn supported by a motor housing. The motor shaft extends through the bearings to the outside of the motor, where the propeller is mounted, also by means of bearings.

The stator is the stationary part of the motor's electromagnetic circuit and usually consists of either windings or permanent magnets.

The rotor and stator are separated by an air gap.

The propeller is mounted on a shaft that is connected to and rotated by the motor mounted in the aircraft body. The structure is fairly complex, as separate bearings are required for the motor rotor and for the propeller. Such a structure ensures, though, that the radial force generated in the motor is balanced and so the loading on bearings on the rotor is balanced around the rotor.

Axial flux motors are known to provide higher performance than a radial electric motor. Such motors comprise two discs, one having magnets arranged thereon, the other having windings, facing each other and separated by an air gap. The discs have a relative rotation to cause a magnetic flux to generate power. Such motors are often used in low speed applications such as an in-wheel motor for electric cars.

As axial flux motors are known to provide better performance than standard electric motors, it would be advantageous to use such motors in propeller aircraft to drive the propeller. For such high power ranges, though, the diameter of the axial flux motor rotor and stator discs needs to be proportionally large. Greater structural strength is then required to counteract the magnetic attractive force between them so as to maintain the air gap required to generate flux. This leads to a bigger, heavier motor and is, therefore, much less suitable for lighter aircraft that are usually propeller driven.

Further, due to the larger discs required to maintain the air gap, the force on the bearings will not be balanced, causing uneven wear on the bearings.

It would be advantageous to be able to use an axial flux motor to drive the propeller of an aircraft without the above problems.

SUMMARY

According to the disclosure, there is provided an electric propulsion system comprising a propeller and a motor arranged to rotate the propeller, the motor comprising an axial flux motor comprising a rotor disc and a stator disc mounted in face-to-face relationship with an air gap defined therebetween, the rotor disc driven to rotate relative to the stator disc to cause magnetic flux in the air gap to cause rotation of the propeller; characterised in that the propeller is directly attached to the rotor disc to rotate with the rotor disc.

BRIEF DESCRIPTION OF THE DRAWINGS

Preferred examples will now be described by way of example only and with reference to the accompanying drawings.

FIGS. 2A-2C shows moment forces for different locations of the propeller.

DETAILED DESCRIPTION

Figure 1:
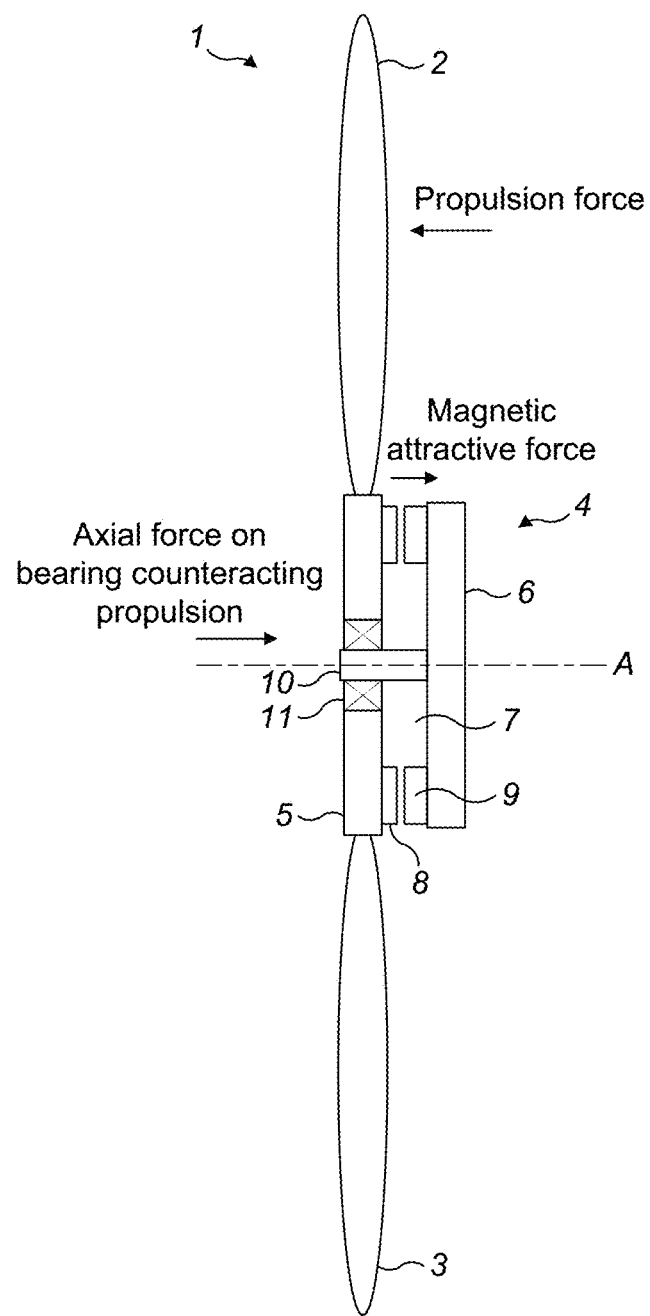
FIG. 1 is a schematic side view of an electric propulsion system according to the present disclosure.

Referring to FIG. 1, the electric propulsion system of the disclosure comprises a propeller 1 having two or more blades 2, 3. The propeller, in use, would be mounted to the exterior of a propulsion vehicle such as a propeller driven aircraft to rotate and drive the vehicle forward with a propulsion force.

The propeller 1 is caused to rotate by means of an electric motor 4.

The electric motor 4 is an axial flux motor comprising a rotor disc 5 and a stator disc 6. The rotor disc 5 and the stator disc 6 are mounted face to face in an axial direction A with an air gap 7 defined therebetween. Permanent magnets 8 are provided on the rotor disc, facing the stator disc 8 on which windings 9 are mounted.

The rotor disc 5 is mounted on a shaft 10 via bearings 11 and is powered to rotate about the axis A relative to the stator disc 6. The relative motion between the permanent magnets and the windings creates a magnetic flux providing rotational power to the rotor disc 5 which, in turn, rotates the propeller 1 with the required speed to propel the vehicle.

The axial flux motor is mounted such that the rotor disc 5 is more forward in the direction of propulsion that the stator disc 6.

As indicated in FIG. 1 an axial propulsion force is created by the rotating propeller 1 against the direction of forward movement of the vehicle. A magnetic attractive force is also created between the stator disc and the rotor disc. In current engines, the thrust load acts through thrust bearings 11 that transmit the load to the engine and airframe. These bearings have minimal axial movement in them (bearing internal clearance only), and their use in an axial flux motor would adequately control the air gap, to retain the air gap against the attractive magnetic force. Magnetic force can be used to reduce the forces acting on the thrust bearings 11, therefore reducing the bearing and housing mass.

The force on the rotor and bearings acting to counter the propulsion force will, when the rotor is mounted in the forward moving direction of the vehicle relative to the stator, be opposite the direction of the magnetic attractive force between the rotor disc and the stator disc. The resultant load on the rotor disc and bearings is the sum of the counter-force and the magnetic attractive force acting in opposite directions.

Depending on the requirements of the vehicle being propelled, the moment forces can be adjusted by changing the relative positions between the magnetic and propulsion forces. One way to do this is by changing the position at which the propeller 1 is mounted on the rotor disc 5 relative to the magnets 8. Alternatively, the propeller blade length can be changed.

FIG. 1 shows one example, having the propeller blades 2,3 mounted on the outer periphery of the rotor disc 5 close to the magnets 8. The resultant force diagram is shown in FIG. 2 (a).

Figures 3A, 3B:
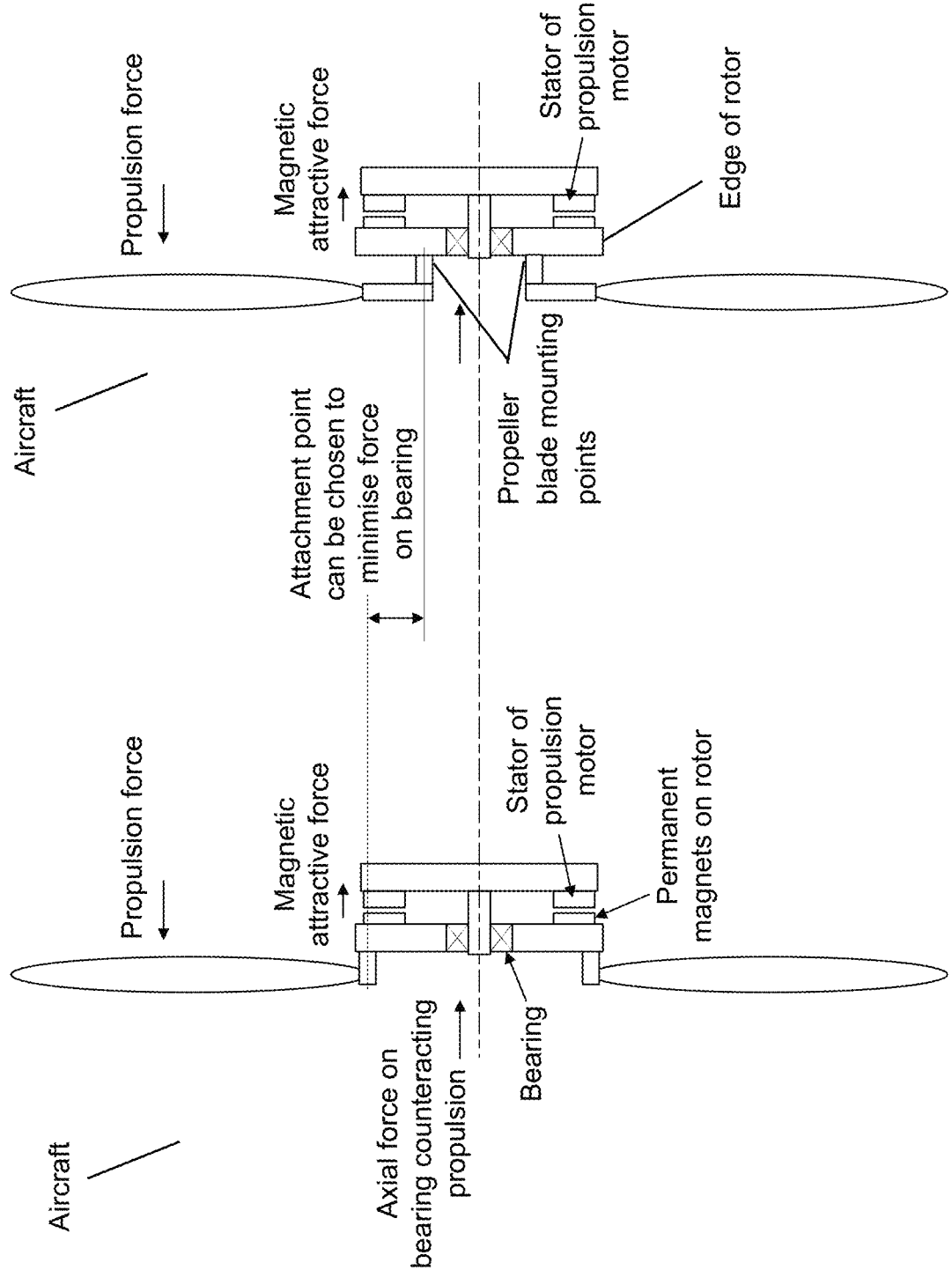
FIGS. 3A and 3B are schematic side views of alternative embodiments of the system.

Alternatively, the propeller blades could be mounted on the outer face of the rotor disc just within the outer periphery as shown in FIG. 3A or, alternatively, mounted on the outer face, closer to the axis A as shown in FIG. 3B.

If the propeller is mounted radially inwardly of the magnets 8, a force diagram may look like that shown in FIG. 2 (b). Alternatively, the magnets could by mounted radially inwardly relative to the propellers providing a force diagram as shown in FIG. 2 (c).

In FIGS. 2 (a), (b) and (c), $F_p$ represents the force counteracting the propulsion, $F_m$ is the magnetic attractive force, $L_m$ is the radial distance from the hub centre to the point through which the magnet attraction forces act. and $L_p$ is the radial distance from the hub centre to the point through which the propeller thrust forces act. k is the ratio between $L_p$ and $L_m$ and is a factor representing the spacing between the propulsion force and the magnetic force.

The attachment point of the propeller 1 relative to the position of the magnets 8 can be permanently set or can be dynamically adjusted by means of an actuator. Depending on the balance between the forces, an optimum attachment point can be determined.

By mounting the propeller 1 directly onto the rotor disc 5, it is possible to control the moment force on the rotor disk to minimise stress on the bearings, the rotor and other motor components.

As stress on the rotor is reduced, less strength in the components is required and so the weight of the system is reduced. Also, the load on the bearings is reduced, leading to a longer bearing life. The propulsion system has a simple constructions and the need for bearings on a propeller shaft is eliminated.

The invention claimed is:

1. An electric propulsion system, comprising:
   a propeller;
   an axial flux motor arranged to rotate the propeller,
   the axial flux motor comprising an air gap between a rotor and a stator, the rotor driven to rotate relative to the stator to cause magnetic flux in the air gap to cause rotation of the propeller;
   wherein permanent magnets are provided on the face of the rotor facing the stator and windings are provided mounted to the stator;
   wherein the propeller is directly mounted to the rotor to rotate with the rotor; and
   wherein the propeller comprises propeller blades mounted radially inwards of an outer edge of the rotor; and
   a shaft on which the stator is fixedly mounted, the rotor being arranged to rotate about the shaft via bearings, wherein the bearings are provided between the shaft and the rotor.

2. The system of claim 1, wherein the propeller comprises the propeller blades mounted adjacent or on an outer edge of the rotor.

3. An aircraft including the electric propulsion system as claimed in claim 1.

* * * * *